United States Patent [19]
Brittain et al.

[11] 3,752,284
[45] Aug. 14, 1973

[54] ACCELERATION AND SPEED RESPONSIVE ELECTRONIC CLUTCH CONTROLS

[75] Inventors: William J. Brittain, Westcliff-on-Sea; David J. Price, Rayleigh, both of England

[73] Assignee: Ford Motor Company, Dearborn, Mich.

[22] Filed: Sept. 23, 1971

[21] Appl. No.: 183,192

[30] Foreign Application Priority Data
Feb. 23, 1971  Great Britain...................... 5,202/71

[52] U.S. Cl. ........ 192/103 F, 192/0.052, 192/0.076, 192/3.58, 192/103 C
[51] Int. Cl. .................... F16d 43/284, B60k 21/00
[58] Field of Search ............ 192/103, 103 C, 103 F, 192/104, 104 F, 3.56, 84 R; 310/95

[56] References Cited
UNITED STATES PATENTS
3,645,366  2/1972  Ito et al. ........................ 192/3.56 X
1,686,827  10/1928  Maag .............................. 192/103 R
2,175,219  10/1939  Sanford........................... 192/3.56 X
2,974,769  3/1961  Henderson ...................... 192/103 C
3,372,602  3/1968  Papst .............................. 192/3.56 X
3,437,188  4/1969  Long .............................. 192/103 F

*Primary Examiner*—Benjamin W. Wyche
*Attorney*—Keith L. Zerschling, Robert W. Brown et al.

[57] ABSTRACT

A system for controlling the engagement and disengagement of a clutch for a motor vehicle. Voltages proportional to clutch input member acceleration and speed and to clutch output member speed are developed. Clutch actuator means coupled to electrical circuitry responds to these voltage signals to control clutch engagement and disengagement. Additional control circuitry may be provided.

5 Claims, 3 Drawing Figures

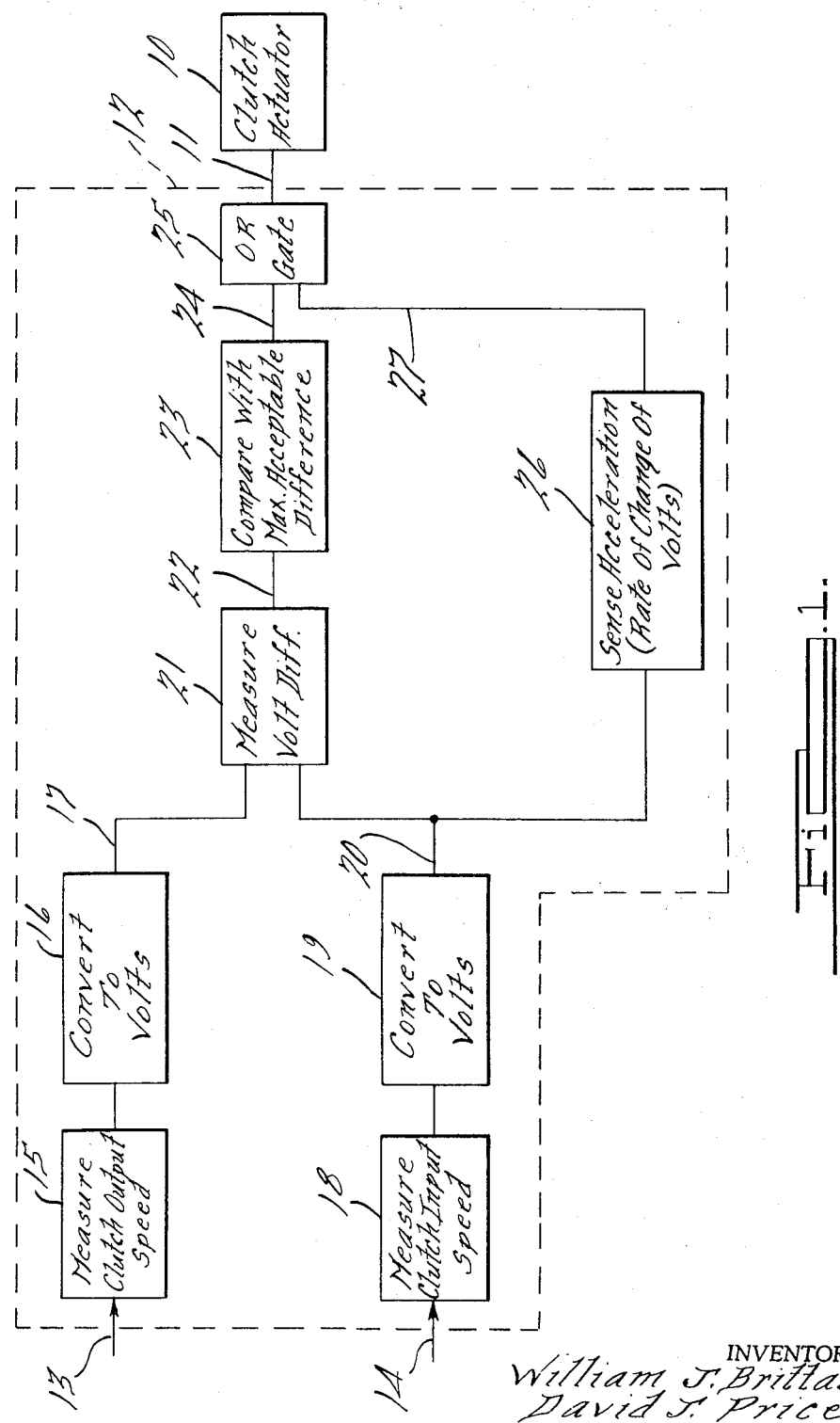

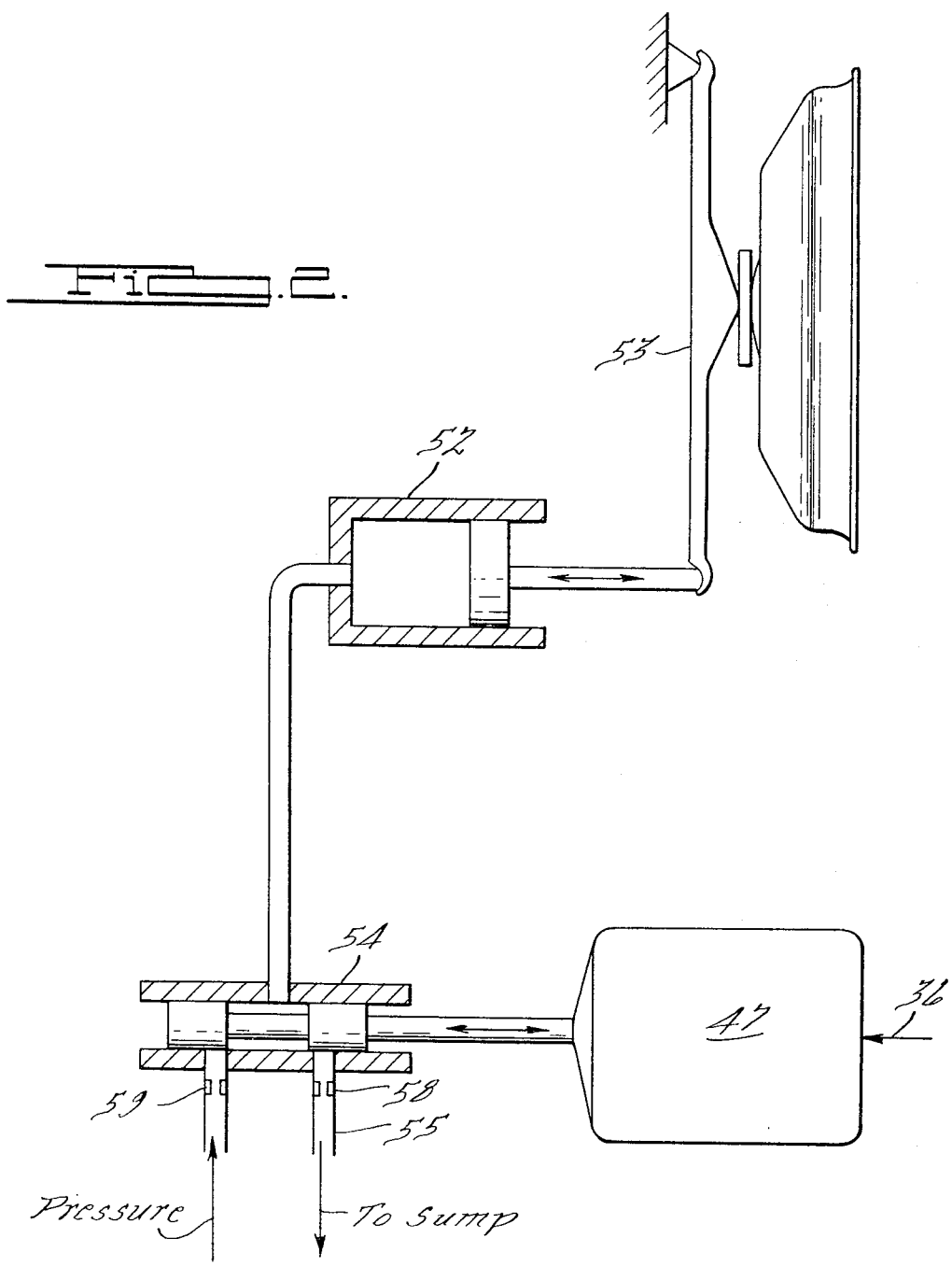

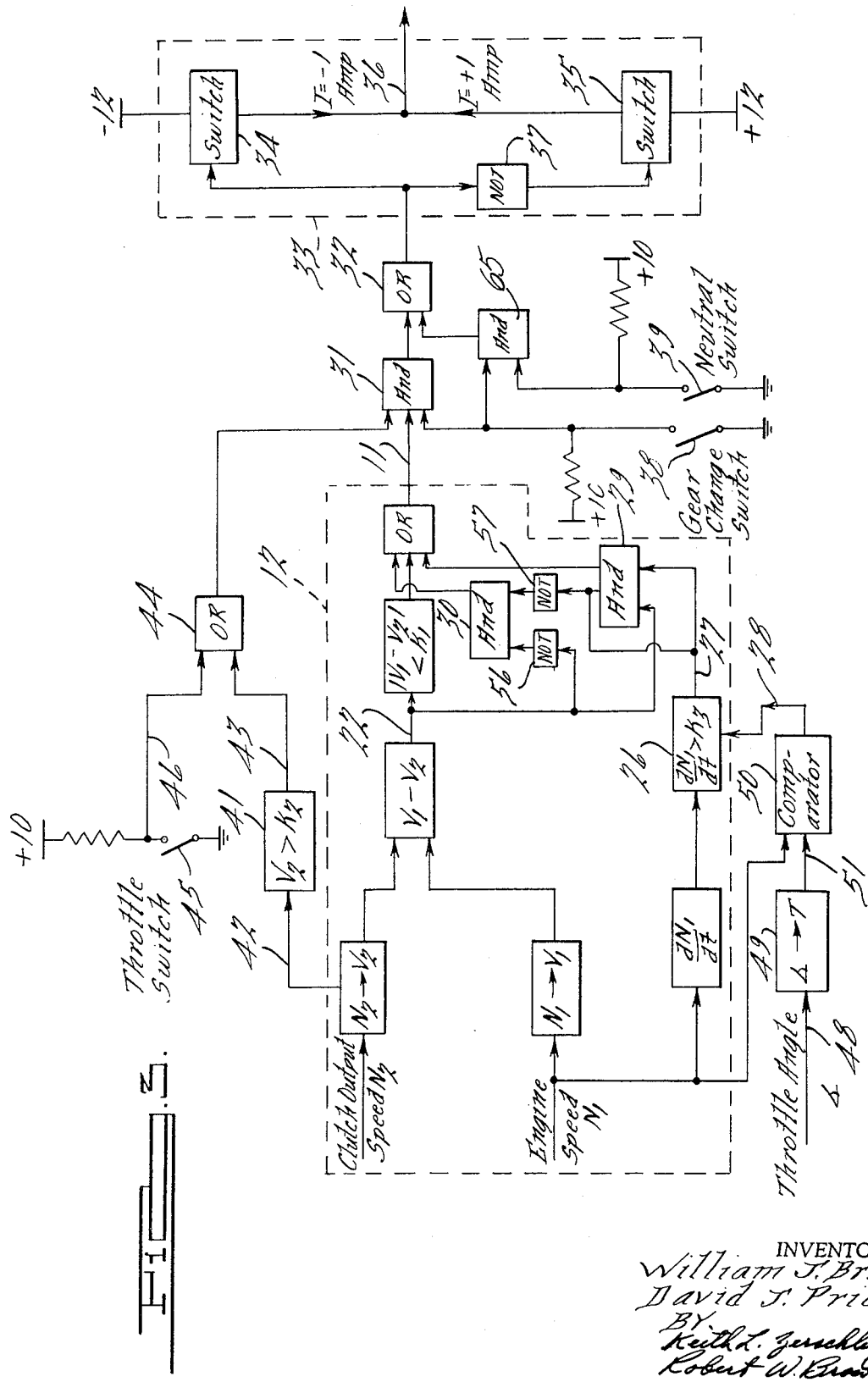

ACCELERATION AND SPEED RESPONSIVE ELECTRONIC CLUTCH CONTROLS

This invention relates to a friction clutch control system, and in particular to a system for controlling engagement and disengagement of a clutch in a motor vehicle driveline.

It has been proposed that such a control system should sense engine speed and allow the clutch to move towards engagement if the engine speed exceeds a certain value or towards disengagement if the engine speed falls below that value. Such a system controls the clutch during engagement to maintain a constant speed. This speed may be the maximum torque speed at the selected throttle setting.

It is difficult to obtain smooth clutch engagement over a wide range of throttle angles and engine speeds with such a "constant speed" system.

According to the invention a control system for the progressive engagement of a friction clutch, has the following features:

a. the clutch has an input member and an output member; and b. when the speed of the input member is greater than the speed of the output member the clutch members move towards engagement under the control of a clutch engagement control circuit if the acceleration of the input member exceeds a control value.

The invention will now be described with reference to the accompanying drawings, in which:

FIG. 1 is a block diagram of a clutch control system embodying the invention.

FIG. 2 is a diagram of a motor vehicle clutch actuating arrangement for use with a control system embodying the inventon.

FIG. 3 is a circuit diagram of an alternative clutch control system having a number of further features not in the embodiment of FIG. 1.

A motor vehicle friction clutch of conventional design interconnects an internal combustion engine and a gearbox. The clutch is engaged and disengaged by a clutch actuator 10 (FIG. 1) which is controlled by electrical signals on line 11. The clutch actuator is such that when a signal is present on line 11 the clutch moves towards engagement and when there is no signal on line 11 the clutch moves towards disengagement. Thus, the output line 11 is such that when a first condition exists thereon, the clutch moves toward engagement, and when a second condition exists, it moves toward disengagement. A suitable actuator is described below with reference to FIG. 2 but provided that the actuator engages or disengages the clutch with a substantially uniform movement, other forms of motive power such as an electric motor, air pressure, etc., may be used.

The clutch control signal on line 11 is developed by a control circuit 12. A transducer (not shown) detects movement of the clutch output shaft and applies an electrical signal to an input line 13. A second input line 14 is connected to a source of electrical signals generated by the engine. Circuits 15 and 16 produce a voltage on line 17 proportional to the speed of the clutch output shaft and circuits 18 and 19 produce a voltage on line 20 proportional to the engine speed, i.e., to clutch input speed.

Circuit 21 subtracts the signal on line 17 from the signal on line 20 to produce on line 22 a differential voltage proportional to the difference between clutch input and output speeds. A comparator circuit 23 compares the voltage on line 22 to a first reference voltage corresponding to the maximum difference in clutch input and output speeds for which the clutch can be smoothly engaged. If the speed difference is within acceptable limits, the comparator circuit produces an output signal on line 24 which is effective through an OR gate 25 to energize line 11 and engage the clutch.

U.S. Pat. No. 3,645,366, issued Feb. 29, 1972 to Numazawa and Ito, illustrates transducers and circuits capable of performing the functions specified for circuits 15, 16, 18, 19 and 21, and the disclosure contained in this patent is incorporated herein by reference. With respect to the comparator circuit 23, this is well known to one of ordinary skill in the art as is evidenced by the description and illustration of comparator circuits in the well-known book by H. V. Malmstadt and C. G. Enke, *Digital Electronics for Scientists*, W. A. Benjamin Inc., New York, 1969, particularly pages 8–10.

The voltage signal on line 20 is also applied to a differentiating circuit 26 which produces a signal representative of the acceleration of the engine and energizes its output line 27 if the engine is accelerating (i.e., when the rate of change of engine speed is greater than zero). Both passive and active differentiating circuits are illustrated in Landee, Davis and Albrecht, *Electronic Designers' Handbook*, McGraw-Hill Book Co., Inc., New York, 1957, pages 19–13 to 19–15. Line 27 is connected to an input of the OR gate 25 so that the output line 11 of the control circuit 12 is energized if the engine is accelerating.

Thus, if the engine is outside the acceptable limits for clutch engagement the actuator moves the clutch in the engagement direction only when the engine is accelerating. If the engine speed falls, the actuator reverses and begins to disengage the clutch until the engine speed begins to increase again.

It is necessary that there is some delay in the response of the actuator to the "engage" signal on line 11 in order to allow engine speed to initally rise when the accelerator or throttle control of the engine is depressed. This delay is provided by the time taken for the actuator to move the clutch from its fully disengaged position to the point at which its friction members begin to engage each other.

A more complete embodiment of the invention is shown in FIGS. 2 and 3.

The circuit shown in the dotted line 12 of FIG. 3 is identical to that described above with reference to FIG. 1 except that the acceleration comparator 26 is responsive to a control signal on line 28 which varies the acceleration comparison value $K_3$ in accordance with throttle angle as described below, and the AND gate 29, AND gate 30 and inverters 56 and 57 responsive to the $V_1$-$V_2$ sinal on line 22 to invert the acceleration control signal on line 27 when the output speed is greater than the engine speed.

The output line 11 of circuit 12 is connected to one input of a three input AND circuit 31. The output of the AND circuit 31 is connected through an OR circuit 32 to an actuator circuit 33. The actuator circuit comprises transistor switches 34 and 35 connected in series with the clutch actuator input line 36 between a d.c. power source of +12 and −12 volts. The output of OR circuit 32 is connected directly to the negative switch 34 and through an inverter 37 to the positive switch 35.

Thus, a current I of −1 amp is supplied to the actuator to effect movement of the clutch towards engagement when there is an output from OR circuit 32 and a current I of +1 amp is supplied to the actuator to effect movement of the clutch towards disengagement when there is no output from OR circuit 32.

A gear change switch 38 is closed whenever a gear change is required to be made thereby disabling the AND gate 31. The gear change switch may be incorporated in the gear lever of a manual gearbox so that it is closed whenever the gear lever is grasped. Alternatively, an automatic gearbox may be arranged to operate the gear change switch.

A neutral switch 39 is opened whenever the gearbox is in neutral. An AND circuit 56 is responsive to the gear change switch 38 and neutral switch 39 to provide an output through OR gate 32 which engages the clutch whenever the gearbox is in neutral and no gear change is being made.

A comparator circuit 41 is responsive to a signal on line 42 representative of clutch output speed to generate a signal on line 43 when the clutch output speed is above engine stalling speed $K_2$. The signal on line 43 is applied to the AND circuit 31 through an OR circuit 44.

A throttle switch 45 is opened and line 46 enetgized whenever the throttle (accelerator pedal) is depressed. The signal on line 46 is applied to the AND circuit 31 through OR circuit 44. The throttle switch thus insures that the clutch cannot be engaged when the vehicle is at rest with the engine idling (AND circuit 31 is disabled) but the clutch will normally remain engaged with the throttle closed until the vehicle speed falls to value such that the engine is just above its stalling speed thereby permitting the engine to decelerate the vehicle.

Throttle angle detector (not shown) generates a signal on line 48 representative of throttle angle. A simple analog computing circuit 49 is responsive to the signal on line 48 to produce a signal on line 51 representative of the maximum torque speed T of the engine corresponding to the particular throttle angle, i.e., that speed at which for the throttle angle selected by the driver the engine will achieve its maximum torque.

A comparator circuit 50 compares the actual engine speed signal on line 20 to the maximum torque speed signal on line 51 and produces an acceleration reference signal on line 28. If the actual engine speed goes above the maximum torque speed the acceleration reference $K_3$ becomes negative, whereas it is positive if the actual engine speed is below the maximum torque speed.

Referring now to FIG. 2, the clutch actuator comprises a hydraulic slave cylinder 52 connected in the conventional manner to a clutch actuator lever 53. The slave cylinder 52 is connected to a moving coil operated spool valve 54. A moving coil actuator 47 is connected to the clutch actuator circuit output line 36. When a negative current flows in the moving coil the spool valve moves to connect the slave cylinder to an outlet 55 connected to the sump of a hydraulic pump (not shown) through a restricted orifice 58 so that the clutch spring returns the clutch to engagement at a rate controlled by flow of liquid through the restricted orifice to the outlet.

When a positive current flows in the moving coil, the spool valve moves to connect the slave cylinder to a hydraulic pump which supplies pressurized liquid through another restricted orifice 59 to displace the piston of the slave cylinder thereby moving the clutch to disengage.

The characteristic of the computing circuit 49 may be arranged to produce a signal lower than that which would correspond to maximum torque speed for the idle position of the throttle, thereby giving the clutch a tendency to engage when the engine is idling and the clutch output speed is high. This would insure clutch engagement when a low gear is engaged for slowing down the vehicle without requiring depression of the throttle by the driver.

Based upon the foregoing description of the invention, what is claimed and desired to be protected by Letters Patent is:

1. A system for controlling the engagement and disengagement of a clutch, said clutch having an input member driven by an engine and having an output member, said control system comprising: control circuit means for generating an electrical output signal having a first conditon and a second condition, said control circuit means including circuit means for obtaining a differential voltage proportional to the difference in speed of said clutch input and output members, circuit means for comparing said differential voltage with a first reference voltage, and circuit means for placing said output signal on said first condition when said differential voltage is less than said reference voltage;

clutch actuator means responsive to said control circuit output signal for causing said clutch to move toward engagement when said output signal is in said first condition and for causing said clutch to move toward disengagement when said output signal is in said seond condition; and circuit means for obtaining a voltage proportional to the acceleration of said clutch input member, for comparing said acceleration voltage with a second reference voltage, and for placing said output signal in said first condition if said acceleration voltage is greater than said second reference voltage.

2. A system in accordance with claim 1, wherein said control circuit means further includes circuit means for placing said output signal in said first condition if said acceleration voltage is less than said second reference voltage and if the speed of said clutch input member is less than the speed of said clutch output member.

3. A system in accordance with claim 1, which further includes circuit means for causing said actuator means to disengage said clutch when the speed of said clutch output member is less than a predetermined value.

4. A system in accordance wtih claim 2, which further includes circuit means for causing said actuator means to disengage said clutch when the speed of said clutch output member is less than a predetermined value.

5. A system for controlling the engagement and disengagement of a clutch in a motor vehicle driveline, said clutch having an input member driven by the engine of said motor vehicle and having an output member connected to a gear box that has a gear change lever and a neutral position, said system comprising: circuit means for produicng a signal varying between a first condition and a second condition, said circuit means being responsive to the speed of said clutch member, the speed of said clutch output member, and the acceleration of said clutch input member; and clutch actuator means, connected to said circuit means and to said clutch, for moving said clutch toward engagement when said circuit means output signal is in said first condition and for moving said clutch toward disengagement when said circuit means output signal is in said second condition.

* * * * *